United States Patent [19]

Yamada et al.

[11] Patent Number: 4,959,553

[45] Date of Patent: Sep. 25, 1990

[54] METHOD FOR MEASURING SHAPE AND APPARATUS THEREFOR

[75] Inventors: Seiki Yamada, Ibaraki; Takashi Kawamura, Kobe, both of Japan

[73] Assignee: Sumitomo Rubber Industries, Ltd., Kobe, Japan

[21] Appl. No.: 280,798

[22] Filed: Dec. 7, 1988

[30] Foreign Application Priority Data

Dec. 9, 1987 [JP] Japan ................................. 62-311707

[51] Int. Cl.⁵ ............................................ G01N 21/86
[52] U.S. Cl. ..................................... 250/560; 356/376
[58] Field of Search ................ 250/560, 561; 356/376, 356/381, 387

[56] References Cited

U.S. PATENT DOCUMENTS

| | | | |
|---|---|---|---|
| 3,536,405 | 10/1970 | Flower | 356/381 |
| 3,565,531 | 2/1971 | Kane | 356/381 |
| 3,619,070 | 11/1971 | Angleur | 356/381 |
| 3,749,500 | 7/1973 | Carlson | 356/387 |
| 4,325,640 | 4/1982 | Dreyfus | 356/376 |
| 4,815,857 | 3/1989 | Bragd | 356/376 |

*Primary Examiner*—David C. Nelms
*Assistant Examiner*—Sherrie Hsia
*Attorney, Agent, or Firm*—Armstrong, Nikaido, Marmelstein, Kubovcik & Murray

[57] ABSTRACT

A method and an apparatus for measuring a shape wherein an article having a cross sectional shape to be measured is subjected to scanning along a direction of a width of the article by means of a pair of displacement sensors, wherein the article is moved in a constant direction and the displacement sensors are located substantially opposing to each other with the article being therebetween, and displacements of a surface on one side and of a surface on another side of the article are detected at every constant pitch, then the cross sectional shape is obtained by processing the detected displacements. The method and the apparatus enable to carry out accurate on-line measurement of a cross sectional shape of an article and provide improved quality control.

9 Claims, 9 Drawing Sheets

FIG.5(a)
FIG.5(b)
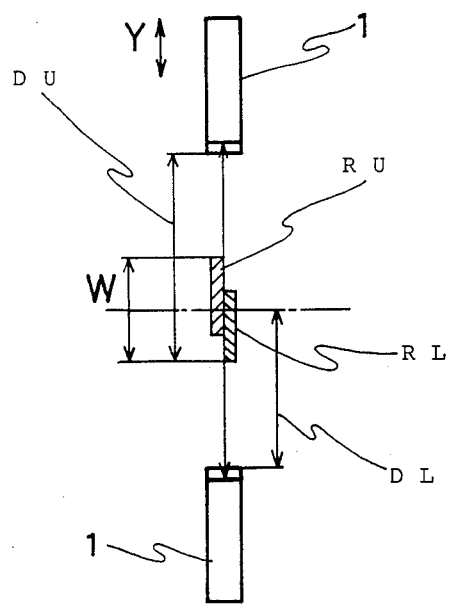
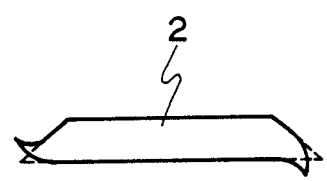
FIG.5(c)
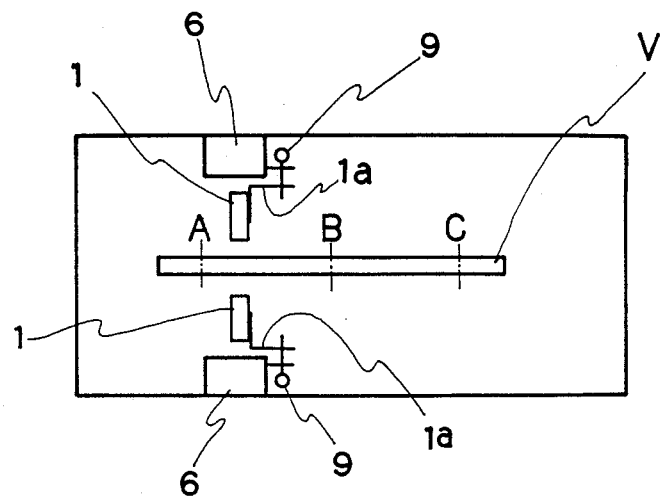

X

METHOD FOR MEASURING SHAPE AND APPARATUS THEREFOR

FIELD OF THE INVENTION

The present invention relates to a method and an apparatus for an on-line measurement of a cross sectional shape of an article to be measured including an article obtained by the extrusion molding such as a tire tread rubber, an insulation rubber or the like, using a pair of displacement sensors such as optical displacement sensors

BACKGROUND OF THE INVENTION

Hitherto, with respect to the dimensional measurement of an article obtained by the extrusion molding, an on-line measurement could be carried out only in a manual measurement of the width thereof by an operator using a measuring tape, and the profile thereof was measured in general by an off-line measurement wherein a cut section obtained by cutting an extruded article was transcribed on paper for subsequent measurement of the cross sectional shape.

However, in the above manual method of on-line measurement, there were problems that other dimensions than the width could not be measured, and that the obtained value was not reliable because of a manual operation. As for the above off-line measurement of the profile by cutting the subject article into a section, there were problems that it is difficult to avoid errors caused by deformation, for example, shrinkage due to temperature change, and that the measurement was usually associated with an individual difference and measuring error because of a manual measurement using a dial gauge or the like.

In view of the above situation, recently various new methods for shape measurement are under development. For example attempts have been made for establishing shape measuring methods including a first method wherein a prespecified designed shape of the cross section of an article is illustrated on a screen of a display by utilizing, for example, a computer system and the actual shape of the cross section obtained by a laser beam scanning at a predetermined portion of the article is also illustrated on the same screen of the display in the same scale and the same view, then the displacement between the two figures illustrated on the display, is measured. A second profile measuring method is where the designed shape showing the contour line of an article is illustrated on a screen of a display based on the design shape data. The actual contour line obtained by image pick-up of the subject article using ordinary light in the same scale and the same view as the designed shape is also illustrated on the same screen of the display. Then the displacement between the two contour lines is measured.

Thus many efforts have been made to solve the problems of the prior art, but in spite of the efforts, an advent of a simple, reliable system for shape measurement which, unlike the above conventional method, does not use a laser beam or the like has been eagerly awaited.

SUMMARY OF THE INVENTION

A method of the present invention for measuring a shape is characterized in that an article having a cross sectional shape to be measured is subjected to scanning along a direction of a width of the article by means of a pair of displacement sensors, wherein the article is moved in a constant direction and the displacement sensors are located substantially opposing to each other with the article being therebetween. Displacements of a surface on one side and a surface on the other side of the article are detected at every constant pitch. Then the cross sectional shape is obtained by processing the detected displacements.

In the above method, it is preferable that measuring ranges of the two displacement sensors partially overlap each other in a longitudinal direction Y (a direction along a line longitudinally passing the subject article from the original shape thereof can be measured.

Further, by knowing in advance the downward deflection of the ball screw, which supports the deflection sensors, through a calibration using a standard block, measured value can be corrected to a more accurate value.

Still further, by employing a construction wherein measuring ranges of the two displacement sensors are shifted relative to each other in a lateral direction X (a direction perpendicular to the movement of the article), mutual interference of the two sensors can be prevented.

BRIEF DESCRIPTION OF THE DRAWINGS

The features and advantages of the present invention will become more clearly appreciated from the following description in conjunction with the accompanying drawings, in which:

FIG. 5(a) is an explanatory view showing, downward deformation and upward deformation of tire tread rubber;

FIG. 5(b) is an explanatory view showing an overlap of measuring ranges of two sensors in a longitudinal direction Y;

FIG. 5(c) is an explanatory view of calibration for an overlap of measuring ranges of two sensors;

DETAILED DESCRIPTION

Hereinafter, a method and an apparatus of the present invention is explained in detail referring to embodiments. However, it should be understood that the present invention is not limited to the embodiments.

Figure 1:
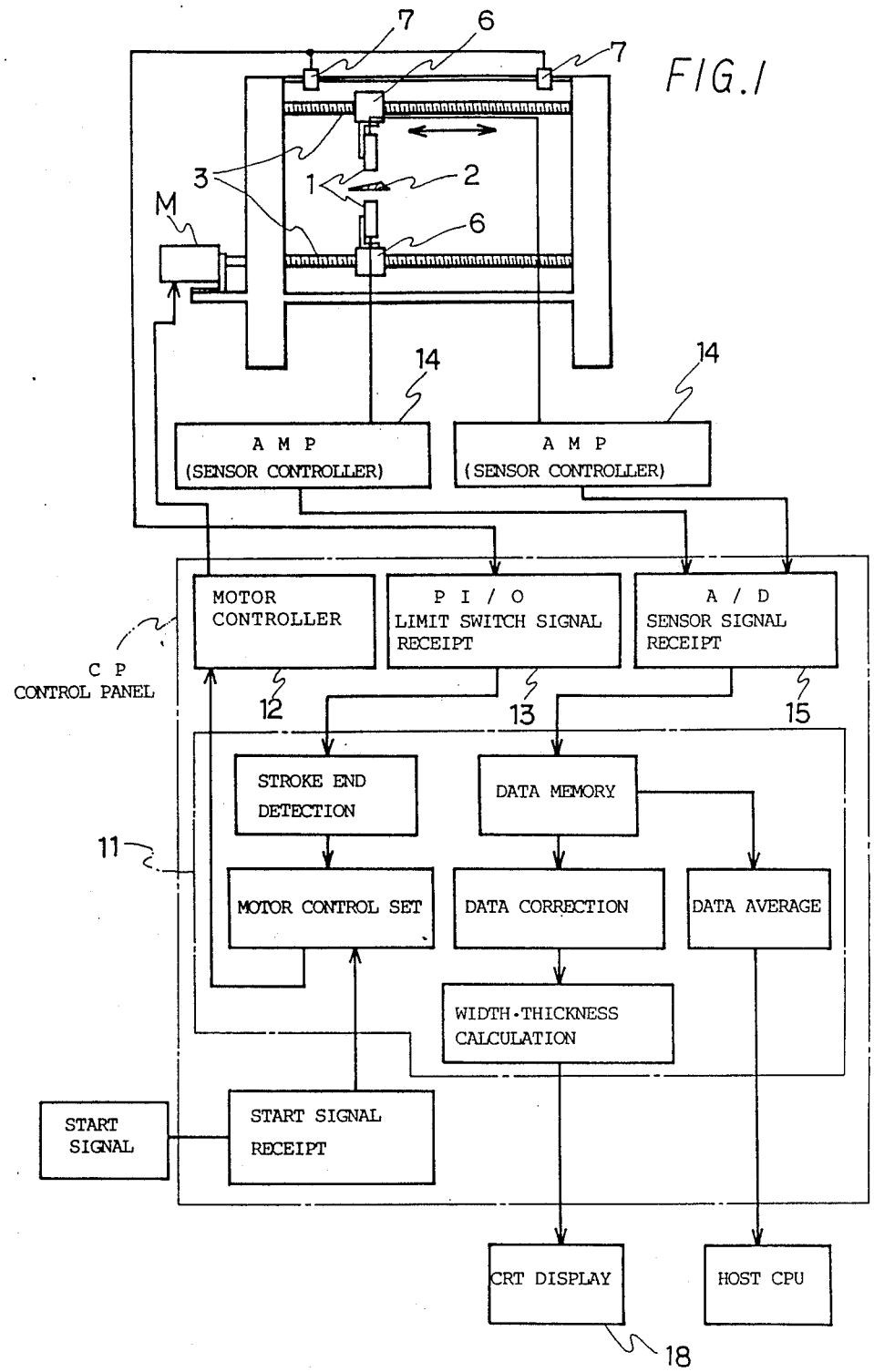
FIG. 1 is a functional block diagram of the apparatus of the present invention.

FIG. 1 is a schematic diagram of a shape measuring apparatus of the present invention. In the apparatus, a pair of optical displacement sensors 1,1 are located on the upper and lower side of a passage for transferring an article 2 being subjected to measurement. The sensors 1,1 are mounted in a manner that scanning along a direction perpendicular to the direction of the movement of the subject article 2, namely the direction of the arrow in FIG. 1 (a direction of the width of the subject article 2), is allowed. Ball screws 3,3 and a motor M, which organize drive means to support the displacement sensors and to drive them for scanning, are provided. The rotation of the motor M is transmitted from the lower ball screw 3 to the upper ball screw 3 via a timing belt 4 and a pulley as shown in FIG. 3(a), thus the upper and the lower ball screws 3,3 are rotated synchronously. In addition, linear guides 5,5 as shown in FIG. 3(a) and limit switches 7,7 are also provided. Thus, a shape measuring portion is constituted by these components. A bracket 6 for supporting the sensor 1 is engaged with a ball screw 3 and concurrently is passed through slidably, by the linear guide 5, thus the bracket 6 is moved to the right or the left in the drawing by the rotation of the ball screw 3. A position of a support 1a for fitting the sensor 1 can be adjusted upwardly or downwardly by a fine adjustment screw 9.

Figure 2A:
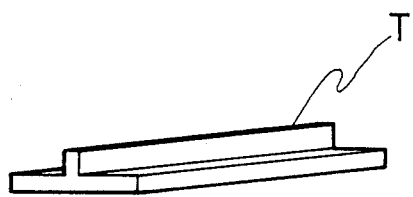
FIG. 2(a) is an explanatory view showing a standard block to be used in a calibration for compensation for downward deflection of a ball screw.
Figure 2B:
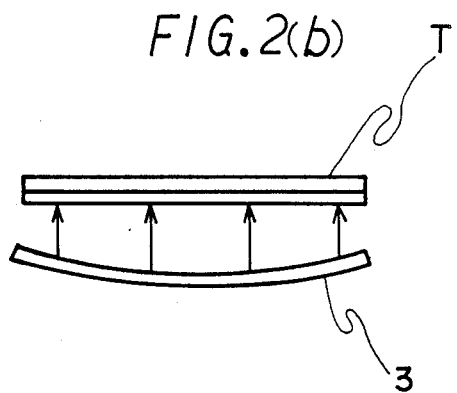
FIG. 2(b) is an explanatory view showing an amount of compensation for downward deflection of a ball screw.

T indicates a standard block to be used for calibration for correction of an error due to the downward deflection of the ball screws 3,3 in such a case that the scanning width is wide and an accurate measurement is required. The standard block T is placed on receiving members 8,8 provided in the shape measuring portion as shown in FIG. 3(a). In case that the ball screws 3,3 downwardly deflect as shown in FIG. 2(b), the distance between the standard block T and the ball screw 3 in the middle is different from that near the end. This change of the distance is measured by scanning of the optical displacement sensor 1, the downward deflection is stored in a memory in a data processing means 11. In accordance with the stored deflection value, measured value of an actual extruded article is corrected and the thickness of the article is calculated.

Further, in case that a part of the subject article 2 (for example tire tread rubber) is upwardly deformed or downwardly deformed from its original shape (indicated by dotted line) as shown in FIG. 5(a), the two optical displacement sensors 1,1 are mounted in such a manner that the measuring ranges of the two sensors partially overlap each other along a longitudinal direction Y as shown in FIG. 5(b), and the overlap is uniformly adjusted along the longitudinal movement Y of the sensors (i.e. the calibration of the overlap). Thus shape measurement can always be carried out with stable accuracy. The adjustment (calibration) of the overlap is explained in FIG. 5(c), in which the optical sensors 1,1 are brought into a state for measuring a fixed point, and the positions of the sensors 1,1 are adjusted upwardly or downwardly by turning fine adjustment screws 9,9 or by adjusting mounting positions of a sensor supporting frame so that the same measured values as a standard gauge V can be obtained at each of the points A, B and C and thus the overlap is adjusted uniformly at any measured point. In the construction wherein measuring ranges of two sensors overlap each other in such a manner as mentioned above, the article to be measured and the standard block for compensation calculation of downward deflections of ball screws are placed within the range W shown in FIG. 5(b). In FIG. 5(b), DU indicates a measuring distance of the upper sensor, RU indicates a measuring range of the upper sensor, DL indicates a measuring distance of the lower sensor and RL indicates a measuring range of the lower sensor.

Figure 3B:
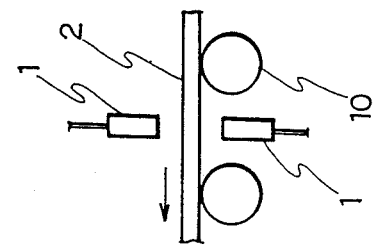
FIG. 3(b) is a detailed view showing a shape measuring portion of the embodiment of FIG. 3 (a)
Figure 3A:
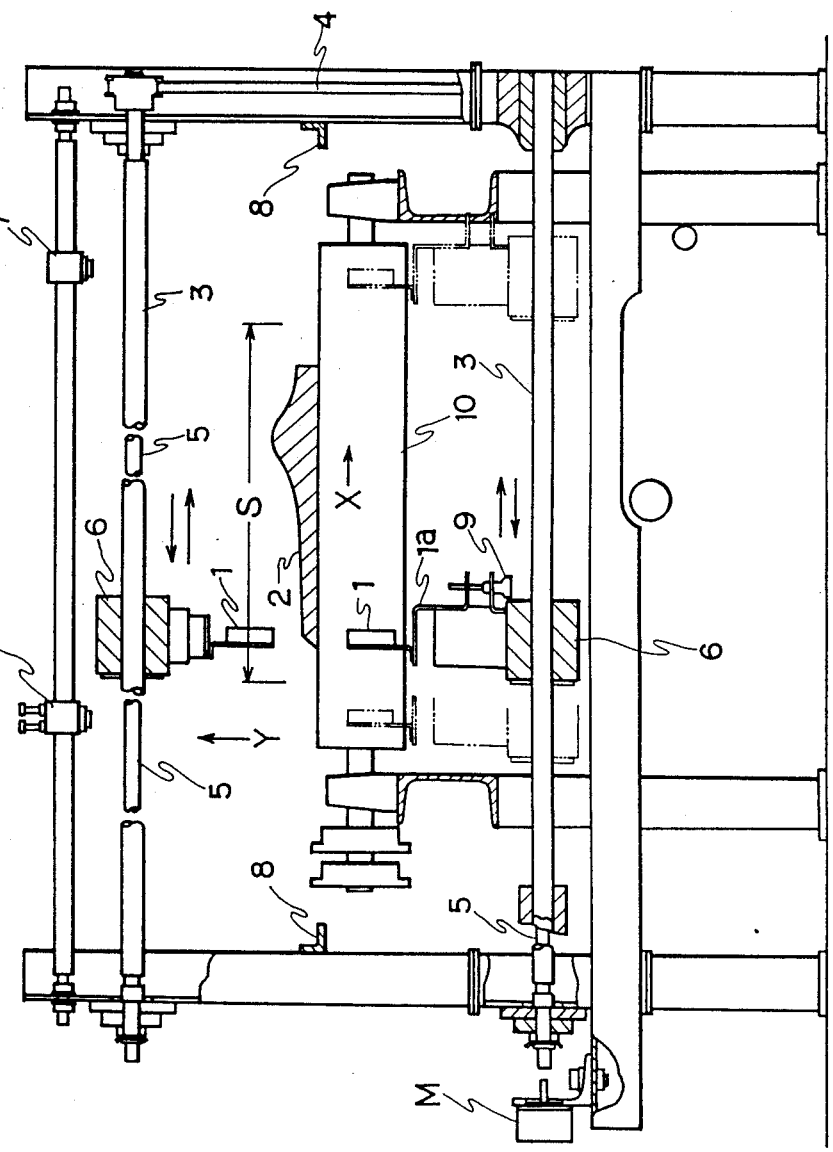
FIG. 3(a) is a schematic view showing an embodiment of an apparatus of the present invention.
Figure 4A:
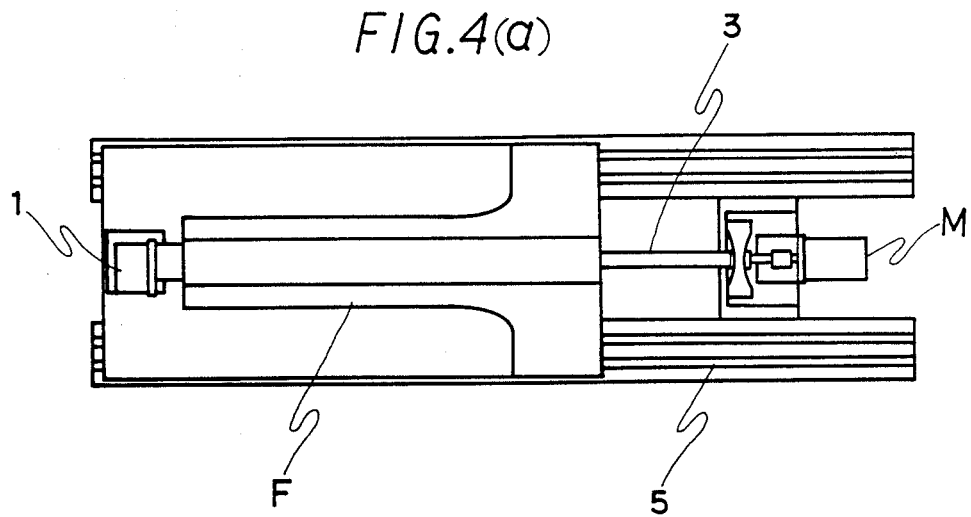
FIGS. 4(a), 4(b) and 4(c) respectively a plan view, a front view and a side view of another embodiment of an apparatus of the present invention.
Figure 4B:
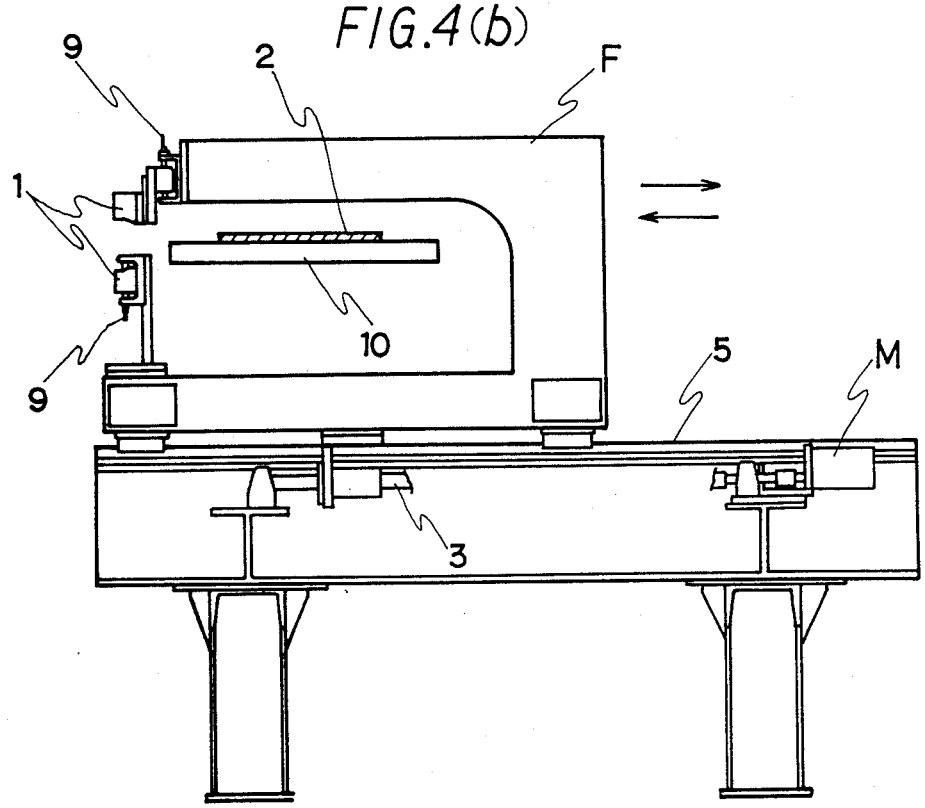

As shown in FIGS. 3(a), 3(b) and 4(b), the subject article 2 is placed on a conveyor 10, receiving surface of which is set at the same height as that of the receiving members 8,8 for the standard block. Then, the scanning by a pair of optical displacement sensors 1,1 is carried out within a range between both limit switches 7,7, and displacement data representing a shape defined by the upper and the lower surfaces of the article 2 is obtained.

As the optical displacement sensor 1, there can be used any sensor capable of measuring shape of the subject article with desired accuracy, and there can also be used, for example, model MD-1211 sensor available from Mitsubishi Electric Corporation. Further, there can be used other therefor types of displacement sensors, for example a magnetic sensor etc., than an optical sensor as the displacement sensor 1. However, an optical displacement sensor is the most preferable sensor because a magnetic sensor requires the article to be made of metal and an optical sensor provides better measuring accuracy, wider measuring range, larger measuring area and other advantages.

The conveyor 10 is, for example, a roller conveyor, and the optical displacement sensors 1,1 are arranged in a clearance between rollers,, and are moved along the longitudinal direction of the rollers for shape measurement of the article which is placed on the rollers and is transferred. It is also possible to carry out simultaneous shape measurements of a plurality of articles which are laid in parallel on the conveyor and are transferred.

In addition, there can be employed a construction wherein a conveyor is made of material capable of transmitting light and measurement is carried out through the conveyor. However, such a measurement requires the conveyor to have a uniform thickness over entire surface and to have no fouling.

With regard to the scanning operation, in case a constant pitch of, for example, 0.5 mm for measurements at every constant pitch and a stroke S of 500 mm for scanning are employed, 1000 measuring points are obtained. If the scanning at every constant distance of the article movement is desired, or scanning at every constant period of time is desired, the scanning is repeated at regular intervals. If the shape measurement at any particlar region of the article is desired, scanning is carried out at a desired timing according to an external command (a manual button for scanning start).

The apparatus as shown in FIG. 1 has a control means comprising a motor controller 12 to control the drive means for sensor scanning, PI/0 13 for signal receiving, amplifiers 14, 14 to amplify sensor outputs, A/D converter; a data processing means (CPU) 11 comprising a data memory, correcting means for erroneous data, an arithmetic logical unit to calculate the width, the thickness etc. of the subject article and the like; and a display means comprising CRT 18. Most of these components are mounted in a control panel CP.

Figure 6:
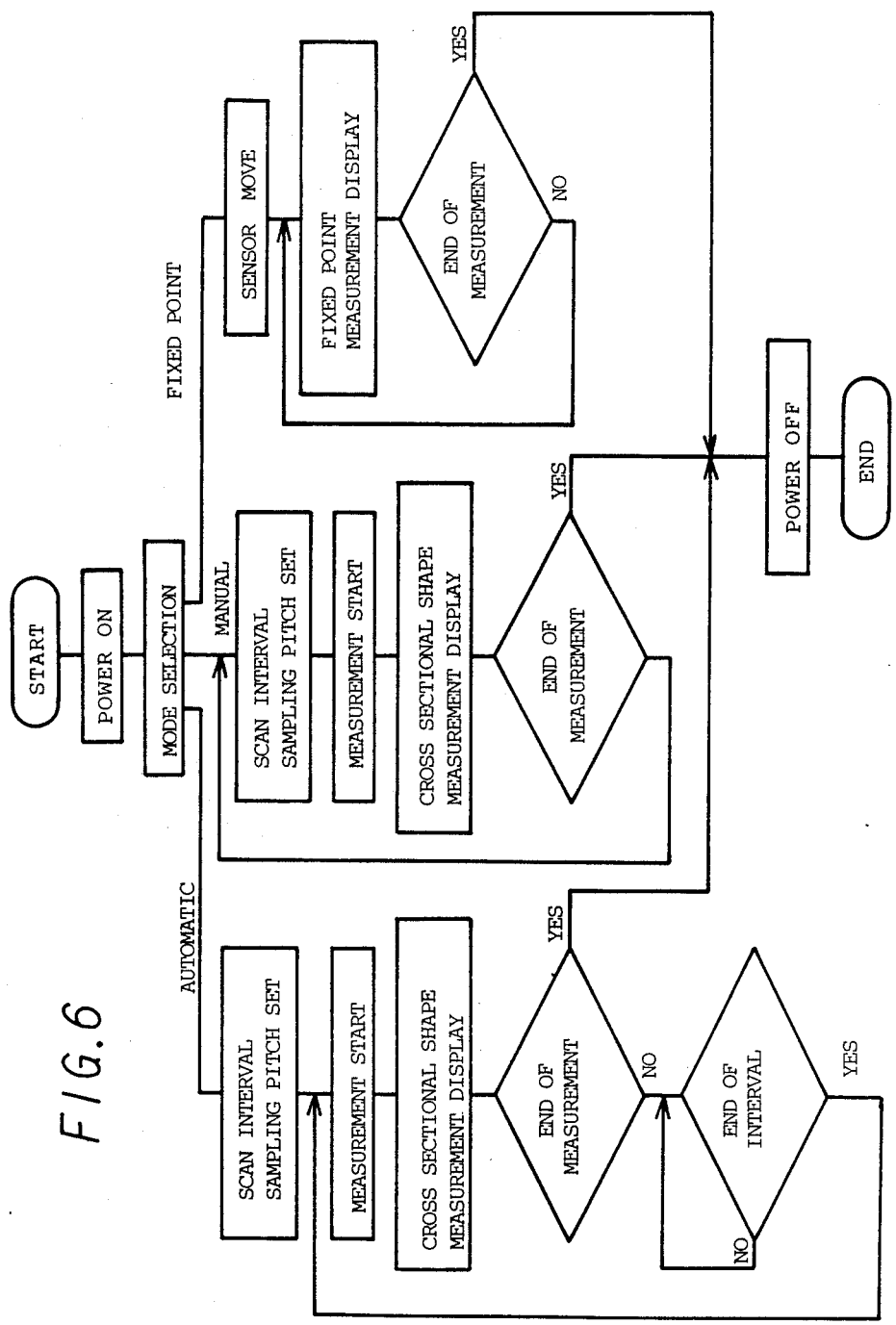
FIG. 6 is a flowchart showing the measuring operation.

FIG. 6 is a flowchart showing the measurement operation. There are three measuring modes, namely "automatic", "manual" and "fixed point", and an appropriate mode is selected among these for desired measurement. In the scanning against the article, the motor M on receipt of a command signal from control means rotates the ball screws to drive the upper and the lower sensors to the right or the left by a constant pitch (or increment) for example. Through this scanning, there is obtained a data representing the shape defined by the upper and the lower surfaces of the subject article.

As the motor M, for example, a high resolution type pulse motor or reversible motor associated with a rotary encoder can be used, and a construction, wherein the motor M is combined with the linear guides and the ball screws, enables the sensors to move in the direction of the width of the article with high accuracy.

Thus, the displacement data obtained at every constant pitch is amplified by the amplifiers 14, 14, then converted from analog form to digital form by A/D converter 15, and the width, the maximum thickness, the distance to the location of the maximum thickness and the like are calculated so that cross sectional shape data is obtained. The obtained data together with the cross sectional shape is displayed on CRT 18.

In addition, information can be delivered to a host computer for the purpose of data storage.

Further, it is possible to calculate the cross sectional area according to the cross sectional shape measured in the above mentioned manner and to calculate the weight per given length based on the volume per given length and specific gravity.

Still further, it is possible to detect a distance from an end of the scanning stroke to an end of the subject article, and moreover in case a plurality of component materials are assembled on an extruder conveyor line into article it is possible to determine relative positions of each component material. Therefore, in case the subject articles to be measured are a tread and an undertread which are respectively components of a tire and both components are assembled to each other in an on-line extruding operation immediately after the extrusion molding, center positions of both components can be brought into agreement with each other by adjusting cutter positions on both side edges of the undertread because it is possible to determine relative positions of both components, by means of the shape measuring system of the present indention.

Figure 7A:
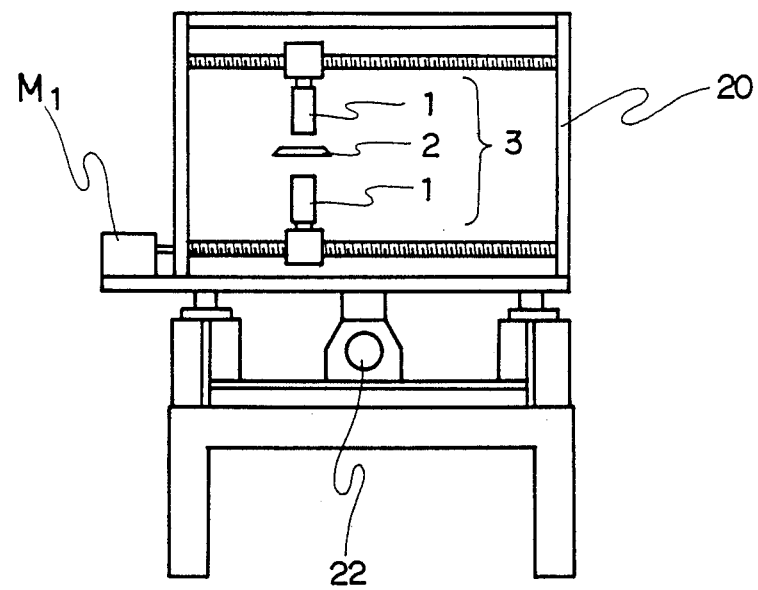
FIGS. 7(a) and 7(b) are respectively a front view and a side view of a mechanism for lateral scanning against an extruded article in a direction of the width perpendicular to the movement of the article.
Figure 7B:
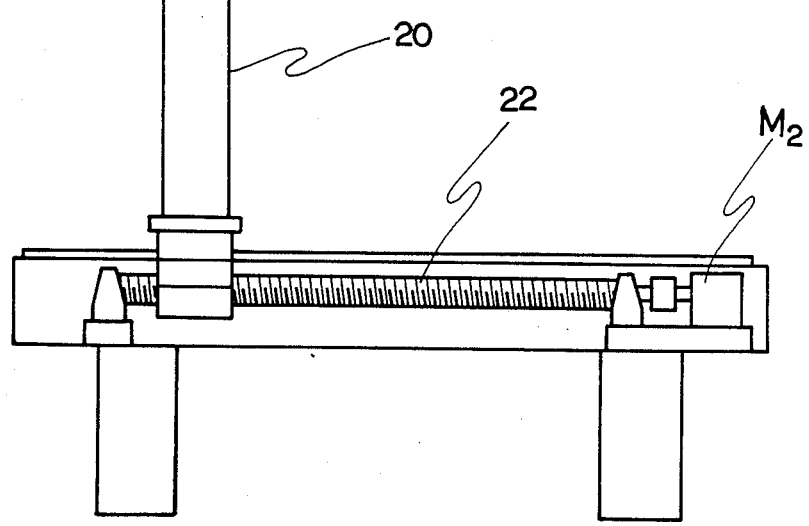
Figure 8A:
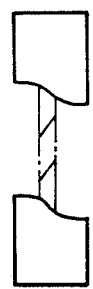
FIG. 8(a) is an explanatory view showing a status of mutual interference of an upper sensor and a lower sensor.
Figure 8B:
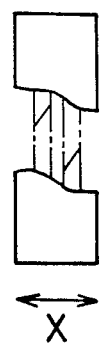
FIG. 8(b) is an explanatory view showing a status of non-interference of an upper sensor and a lower sensor.

When an on-line shape measurement is carried out for a moving article on the above mentioned conveyor by the optical displacement sensors which moves for scanning along a clearance between rollers perpendicular to the movement of the article, the direction of the scanning relative to the moving article is inclined from a direction of the width of the article, and such oblique scanning cannot provide quite an satisfactorily accurate measurement in case snaking or meandering of the article occurs. In order to eliminate a restriction caused by this limited operating condition, lateral scanning in a direction of the width of the moving article can be achieved by moving a sensor supporting frame 20 by means of a motor M2 and a ballscrew 22 as shown in FIGS. 7(a) and 7(b) synchronously in the same speed and the same direction as those of the transferring movement of the conveyor line.

When the subject article does not exist between the upper and the lower sensors within the scanning stroke S of the sensor shown in FIG. 3(a), mutual interference of both sensors occurs to cause false detection to provide an erroneous displacement value. In order to eliminate such mutual interference, the upper and the lower sensors are preferably slightly shifted relative to each other in a lateral direction X (a direction lateral to the movement of the article) and in this case the data processing means is so programmed that the lateral shift is corrected or compensated in an actual shape measurement calculation.

Figure 4C:
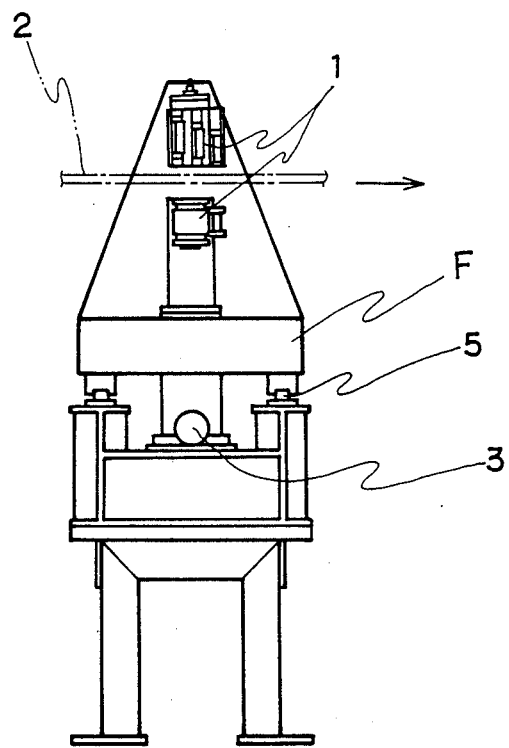

FIGS. 4(a) to 4(c) show another embodiment of a shape measuring apparatus of the present invention, wherein a pair of sensors 1,1 on the upper and the lower sides respectively are supported by a C-shaped frame F, and the frame F is moved on linear guides 5 in the direction indicated by arrows in the drawings (namely, a direction perpendicular to the movement of the article) by means of a ball screw 3 and a motor M for scanning in the direction of the width of the article which is placed on a roller conveyor 10 and transferred.

The apparatus of the present invention can be provided on only one side of the article to be measureD for a single side shape measurment wherein only one sensor is used. Also, the apparatus of the present invention can be easily installed in an existing line. The apparatus of the present invention can be manufactured, for example, in the form of a plurality of components including an upper component having the upper sensor and a lower component having the lower sensor, in which a centering operation (or a parallelism adjustment operation) for the ballscrew and the linear guide in each of the upper and the lower components has been completed. Such components can be easily mounted on an apparatus for accurate measurement.

A method and an apparatus for shape measurement of the present invention make it possible to achieve an accurate on-line measurement of a shape of a moving article. Thereby, an on-line measurement of a cross sectional shape of an extruded article and immediate comparison on the spot between the measured shape and the standard shape in digital form or in visual form are provided, consequently an improved quality control is attained. Further, since an on-line monitoring of the position and the width of the subject article is also provided, the present invention can be advantageously applied, for example, to a control of width or thickness of an extuded product or to an alignment or a position adjustment for assembling a plurality of component materials into a multiplex article on an extruder conveyor.

What we claim is:

1. A method for measuring a shape comprising the steps of:
    moving an article in a constant direction;
    locating a pair of displacement sensors substantially opposing each other with the article therebetween;
    scanning the article, having a cross sectional shape to be measured, along a direction of width of the article by moving said pair of displacement sensors laterally along a direction perpendicular to the direction of movement of the article;
    detecting displacements of a surface on one side and detecting displacements of a surface on another side of the article at every constant pitch; and
    obtaining the cross sectional shape by processing the detected displacements.

2. A method of claim 1, further comprising the step of partially overlapping measuring ranges of each of the two displacement sensors in a longitudinal direction Y.

3. A method of claim 1, further comprising the steps of supporting the displacement sensor by means of a ball screw and compensating a downward deflection of the ball screw in a shape measurement calculation.

4. A method of claim 2, further comprising the steps of supporting the displacement sensor by means of a ball screw and compensating a downward deflection of the ball screw in a shape measurement calculation.

5. A method of claim 1, further comprising the steps of shifting measuring ranges of the two displacement sensors relative to each other in a lateral direction X and compensating the lateral shift in a shape measurement calculation.

6. A method of claim 2, further comprising the steps of shifting measuring ranges of the two displacement sensors relative to each other in a lateral direction X and compensating the lateral shift in a shape measurement calculation.

7. A method of claim 3, further comprising the steps of shifting measuring ranges of the two displacement sensors relative to each other in a lateral direction X and compensating the lateral shift in a shape measurement calculation.

8. A method of claim 4, further comprising the steps of shifting measuring ranges of the two displacement sensors relative to each other in a lateral direction X and compensating the lateral shift in a shape measurement calculation.

9. An apparatus for measuring a shape comprising:
   a pair of displacement sensors located substantially opposing to each other with an article therebetween, said sensors scanning along a width of the article by moving laterally along a direction perpendicular to a direction of movement of the article;
   a drive means for driving the displacement sensors for scanning the width of the article;
   a transfer means for moving the article in the direction crossing the scanning direction of the displacement sensors;
   a control means for controlling the driving of the displacment sensors; and
   a data processing means for processing data obtained by the displacement sensors.

* * * * *